US011862368B2

(12) United States Patent
Chen et al.

(10) Patent No.: US 11,862,368 B2
(45) Date of Patent: Jan. 2, 2024

(54) INDUCTOR FRAMEWORK AND INDUCTANCE DEVICE

(71) Applicant: OPPLE LIGHTING CO., LTD., Shanghai (CN)

(72) Inventors: Feng Chen, Shanghai (CN); Xiao Jiao, Shanghai (CN); Dali Zhou, Shanghai (CN); Yaoliang Chen, Shanghai (CN); Jianping Han, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 550 days.

(21) Appl. No.: 17/139,799

(22) Filed: Dec. 31, 2020

(65) Prior Publication Data

US 2021/0125771 A1 Apr. 29, 2021

Related U.S. Application Data

(63) Continuation of application No. PCT/CN2019/097135, filed on Jul. 22, 2019.

(30) Foreign Application Priority Data

Jul. 23, 2018 (CN) ......................... 201810813649.3
Jul. 23, 2018 (CN) ......................... 201821169172.1

(51) Int. Cl.
*H01F 27/32* (2006.01)
*H01F 27/28* (2006.01)
(Continued)

(52) U.S. Cl.
CPC ......... *H01F 27/2823* (2013.01); *H01F 27/24* (2013.01); *H01F 27/306* (2013.01)

(58) Field of Classification Search
CPC .... H01F 27/2823; H01F 27/24; H01F 27/306; H01F 2005/046; H01F 2027/065;
(Continued)

(56) References Cited

U.S. PATENT DOCUMENTS

2022/0122759 A1* 4/2022 Zhang ................. H01F 27/2828
2022/0122763 A1* 4/2022 Jiao ........................... H01F 5/04

FOREIGN PATENT DOCUMENTS

CN 202394675 U 8/2012
CN 202855466 U * 4/2013 ........... H01F 27/027
(Continued)

OTHER PUBLICATIONS

International Search Report of PCT Application No. PCT/CN2019/097135 dated Oct. 24, 2019 with English translation, (5p).

*Primary Examiner* — Tuyen T Nguyen
(74) *Attorney, Agent, or Firm* — Arch & Lake LLP

(57) ABSTRACT

The present application provides an inductor framework and inductance device. The inductor framework includes a main winding part and an auxiliary winding part that are integrally arranged; the main winding part includes an upper end, a lower end, a main body, and an inserting hole; the main body is located between the upper end and the lower end, the inserting hole successively passes through the upper end, the main body, and the lower end in a direction from the top surface to the bottom surface; the auxiliary winding part extends from the lower end, a side surface of the auxiliary winding part facing away from the upper end is a welding surface; the auxiliary winding part is configured to be wound thereon an auxiliary coil that covers at least a portion of the welding surface, the auxiliary winding part is provided with a position limiting structure.

20 Claims, 8 Drawing Sheets

(51) Int. Cl.
*H01F 27/24* (2006.01)
*H01F 27/30* (2006.01)

(58) Field of Classification Search
CPC .... H01F 17/04; H01F 27/2828; H01F 27/292; H01F 27/325
See application file for complete search history.

(56) References Cited

FOREIGN PATENT DOCUMENTS

| | | | | |
|---|---|---|---|---|
| CN | 203338939 | U | | 12/2013 |
| CN | 206179657 | U | | 5/2017 |
| CN | 108831715 | A | | 11/2018 |
| CN | 208767130 | U | | 4/2019 |
| JP | H0548314 | U | * | 6/1993 |
| JP | H0726819 | Y2 | * | 6/1995 |
| JP | 09134827 | A | | 5/1997 |

* cited by examiner

INDUCTOR FRAMEWORK AND INDUCTANCE DEVICE

CROSS-REFERENCE TO RELATED APPLICATIONS

This application is based upon and claims the priority of PCT patent application No. PCT/CN2019/097135 filed on Jul. 22, 2019 which claims priority to the Chinese patent application No. 201810813649.3 filed on Jul. 23, 2018 and the Chinese patent application No. 201821169172.1 filed on Jul. 23, 2018, the entire contents of all of which are incorporated by reference herein for all purposes.

TECHNICAL FIELD

The present application relates to the technical field of inductor manufacture, and in particular to an inductor framework and inductance device.

BACKGROUND

An inductor is an element able to convert electric energy into magnetic energy to store the magnetic energy, and is widely used in various kinds of electronic products in many industries such as aerospace, communication and household appliance. An inductor generally includes a framework, windings, a shielding case, packaging materials, magnetic cores or iron cores, etc. An inductor framework in the prior art is usually the structure with pins, which is manufactured by the two modes of: 1. placing the pins into a mold when the inductor framework is injection-molded integrally in the mold so that the inductor framework and the pins are injection-molded integrally; 2. inserting the pins into the inductor framework after the injection molding of the inductor framework is finished.

An inductor framework with pins is disclosed in the Chinese patent application No. 2014204352912. This kind of inductor framework is manufactured by the first manufacture mode described above. A conventional inductor framework is the inductor framework with pins which are required to pass through a bonding pad, although there is a high efficiency in the first manufacture mode, a region of a printed circuit board (PCB) occupied by a bonding pad has a large area.

SUMMARY

The present application provides an inductor framework, an inductance device and a winding method thereof to solve the above problems.

The present application adopts the following solutions.

In one aspect, embodiment of the present application provides an inductor framework including a main winding part and an auxiliary winding part that are integrally arranged.

The main winding part includes an upper end, a lower end, a main body, and an inserting hole; the main body is located between the upper end and the lower end, edges of both the upper end and the lower end go beyond the main body and cooperate with the main body to form a main winding groove; the upper end has a top surface facing away from the lower end, and the lower end has a bottom surface facing away from the upper end; the inserting hole successively passes through the upper end, the main body, and the lower end in a direction from the top surface to the bottom surface.

The auxiliary winding part extends towards a direction away from the inserting hole from the lower end, and the auxiliary winding part has an extension direction perpendicular to that of the inserting hole; a side surface of the auxiliary winding part facing away from the upper end is a welding surface which is at a distance from the top surface in the extension direction of the inserting hole no less than a distance between the bottom surface and the top surface in the extension direction of the inserting hole; the auxiliary winding part is configured to be wound thereon an auxiliary coil which at least covers a portion of the welding surface, the auxiliary winding part is provided with a position limiting structure configured to prevent the auxiliary coil that is wound around the auxiliary winding part from separating from the auxiliary winding part.

In other aspect, embodiment of the present application provides an inductance device, which includes a main coil, an auxiliary coil, an upper magnetic core, a lower magnetic core, and any of the inductor framework described above.

The main coil is wound in the main winding groove, the auxiliary coil is wound around the auxiliary winding part and covers a portion of the welding surface; both the upper magnetic core and the lower magnetic core are E-shaped structures, a middle extension portion of each of the E-shaped structures is a central column; the upper magnetic core is capped onto the top surface, the central column of the upper magnetic core is inserted into the inserting hole, the lower magnetic core is capped onto the bottom surface, the central column of the lower magnetic core is also inserted into the inserting hole, and a side surface of the lower magnetic core facing away from the upper magnetic core does not go beyond the welding surface.

BRIEF DESCRIPTION OF THE DRAWINGS

The drawings illustrated here are provided for further understanding the present application and constitute a part of the present application. Exemplary embodiments of the present application, together with the description thereof, are used for explaining the present application, rather than improperly position limiting the present application. In the drawings.

DETAILED DESCRIPTION

Technical solution and advantages of the examples of the disclosure, the technical solutions of the present disclosure are described in connection with the examples of the present disclosure and the corresponding drawings. The described examples are just a part but not all of the examples of the present disclosure. Based on the examples of the present disclosure, those skilled in the art can obtain other example(s), without any inventive work, which should be within the scope of the disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The technical solutions of the present application will be clearly and completely described below in connection with particular embodiments of the present application and corresponding accompanying drawings, so that the objectives, technical solutions and advantages of the present application are more understandable. Apparently, the described embodiments are just a part but not all of the embodiments of the present application. Based on the described embodiments of the present application, those skilled in the art can obtain other embodiment(s), without any inventive work, which should be within the scope of the present application.

In the following, technical solutions provided by embodiments of the present application will be described in detail in connection with the drawings.

Figure 1:
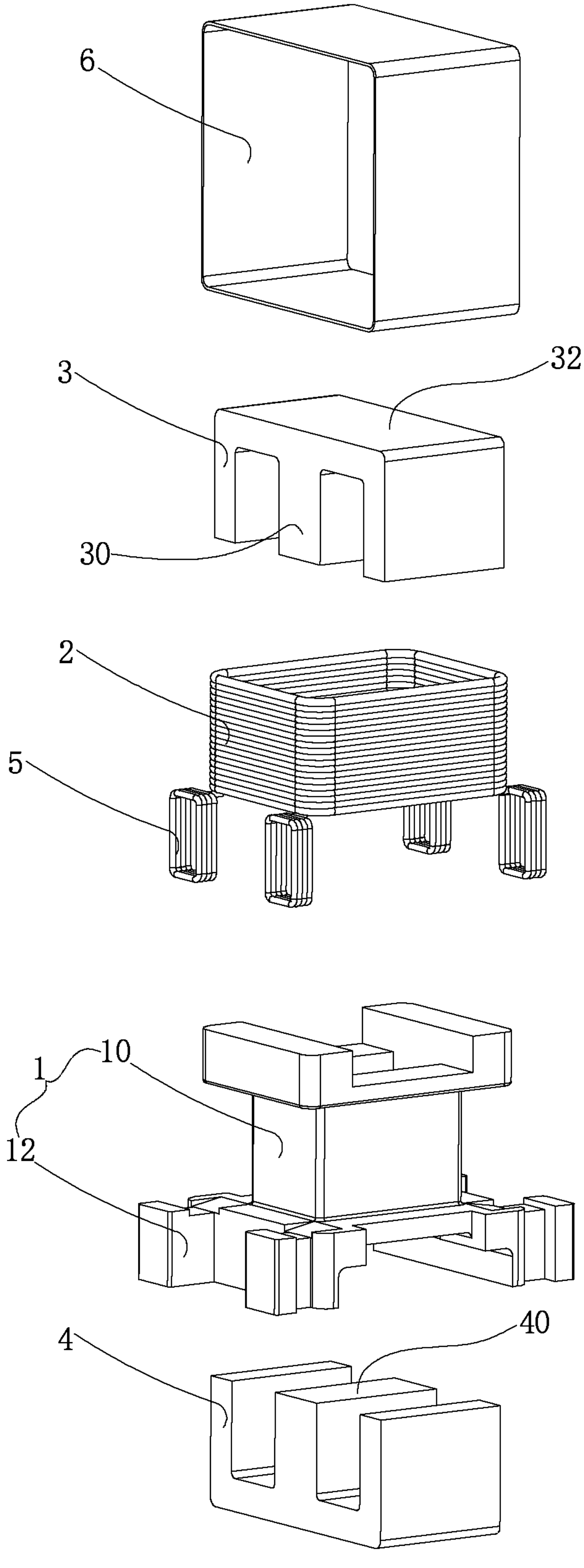
FIG. 1 is an exploded perspective view of an inductance device of the present application.

An embodiment of the present application discloses an inductance device, as shown in FIG. 1, including an inductor framework 1, a main coil 2, an upper magnetic core 3, a lower magnetic core 4, and auxiliary coils 5.

The inductor framework in the embodiment can be made from insulating materials, and it is recommended to use phenolic plastics as the materials of the inductor framework for reduction of cost. Specifically, as shown in FIGS. 2-6, the inductor framework 1 includes a main winding part 10 and auxiliary winding parts 12 that are integrally arranged. The main winding part 10 includes an upper end 100, a lower end 102, a main body 104 located between the upper end 100 and the lower end 102, and an inserting hole 106. Edges of both the upper end 100 and the lower end 102 go beyond the main body 104, and cooperate with the main body 104 to form a main winding groove **104*a* in which the main coil 2 is wound. The upper end 100 and the lower end 102 can restrict the form of the main coil 2 to prevent the main coil 2 from separating from the main body 104. The upper end 100 has a top surface 100*a* facing away from the lower end, and the lower end 102 also has a bottom surface 102*a* facing away from the upper end 100. The inserting hole 106 passes successively through the upper end 100, the main body 104, and the lower end 102 in the direction from the top surface 100*a* to the bottom surface 102*a***.

The auxiliary winding parts 12 extend towards the direction away from the inserting hole 106 from the lower end 102. The auxiliary winding parts 12 have extension directions perpendicular to that of the inserting hole 106, and namely the auxiliary winding parts 12 are arranged at sides of the inserting hole 106. Side surfaces of the auxiliary winding parts 12 facing away from the upper end 100 are welding surfaces 120 which are at a distance from the top surface **100*a* in the extension direction of the inserting hole 106 no less than a distance between the bottom surface 102*a* and the top surface 100*a* in the extension direction of the inserting hole 106, and in other words the welding surfaces 120 are at a lower location than the bottom surface 102*a* so as to be welded with a PCB. The auxiliary winding parts 12 are used to wind the auxiliary coils 5 around them, and the auxiliary coils 5 wound thereon can cover at least a portion of the welding surfaces 120 to be used for welding. There is no special limit to the shape of the auxiliary coils 5, as long as the auxiliary coil 5 can cover a portion of the welding surface 120. For example, it is possible to wind the auxiliary coil 5 annularly between two vertical surfaces 121,122 adjacent to the welding surface 120 and a surface 123 of the auxiliary winding part 12 facing the upper end 100, or between the two vertical surfaces 121,122 and a surface 124 of the auxiliary winding part 12 facing away from the lower end 102, and it is also possible to wind the auxiliary coils 5** in other more complicated way, which will not be discussed herein.

In order to prevent the auxiliary coil 5 from separating from the auxiliary winding part 12, it is necessary to arrange on the auxiliary winding parts 12 a position limiting structure 125 which restricts the auxiliary coil 5 to prevent the auxiliary coil 5 from separating from the auxiliary winding part 12. In the embodiment, the position limiting structure 125 may be arranged on an arbitrary surface of the auxiliary winding part 12. The auxiliary coils 5 are of an integral structure, so the objection of preventing the auxiliary coils 5 from separating from the auxiliary winding parts 12 can be achieved as long as any portion of the auxiliary coils 5 is prevented from separating from the auxiliary winding parts 12. However, in order to ensure the welding effect, the welding surface 120 is preferably as close as possible to the PCB when assembling the inductance device. Thus, it is preferred for the position limiting structures 125 in the embodiment to be arranged on other surfaces of the auxiliary winding parts 12 rather than the welding surfaces 120.

In the embodiment, the position limiting structure 125 may be the structure such as a position limiting block, a position limiting baffle plate, etc., and it is recommended to use the form of a position limiting groove. The position limiting groove 125 (for the sake of description, the reference number 125 of the position limiting structure is used for the position limiting groove in the following) can receive a portion of the auxiliary coil 5 so that the portion of the auxiliary coil 5 cannot separate from the auxiliary winding part 12. The position limiting groove 125 extends in a direction identical, perpendicular, or even inclined to the extension direction of the inserting hole 106. The number of the position limiting groove 125 can be more than one. For example, the vertical surfaces 121 and 122 are provided with one position limiting groove 125, respectively; or the vertical surface 121 is provided with one position limiting groove 125 which has the same extension direction as the inserting hole 106, and the surface 124 is provided with one position limiting groove 125 which extends in a direction perpendicular to the extension direction of the inserting hole 106 (see FIG. 2), and the plurality of position limiting grooves 125 cooperate with each other to limit the position of the auxiliary coil 5. Furthermore, it is also possible to arrange multiple segments of position limiting grooves 125, examples of which will not be given herein.

In the embodiment, the main coil 2 and the auxiliary coils 5 can be wound successively with the same enameled wire when winding, and there is electrical connection between the main coil 2 and the auxiliary coils 5 that are wound, so that the auxiliary coils 5 can supply power directly for the main coil 2. Furthermore, the main coil 2 and the auxiliary coils 5 in the embodiment can also be wound with different enameled wires, respectively, and in this case there is no electrical connection between the auxiliary coil 5 and the main coil 2, the auxiliary coils 5 are only used for fixing and welding.

It is necessary for the main coil 2 to have at least one input end and one output end, and thus, in the usual case at least two of the auxiliary coils 5 are wound with the same enameled wire as the main coil 2. The two auxiliary coils 5 can be used as the input end and the output end of the main coil 2, respectively. Of course, to cope with different application environments, the number of the input end and the output end of the main coil 2 can be changed, and the number of the auxiliary coils 5 in electrical connection with the main coil 2 can be increased further.

As shown in FIG. 1, both the upper magnetic core 3 and the lower magnetic core 4 in the embodiment are E-shaped structures, middle extension portions of the E-shaped structures are central column 30 and 40, respectively. When the winding of the main coil 2 and the auxiliary coils 5 is finished, the upper magnetic core 3 is capped onto the top surface 100*a*, and the central column 30 of the upper magnetic core 3 is inserted into the inserting hole 106 from an opening of the inserting hole 6 at the upper end 100, and extension portions at two sides of the upper magnetic core 3 cover the outer periphery of the main coil 2. The lower magnetic core 4 is capped onto the bottom surface 102*a*, and the central column 40 of the lower magnetic core 4 is inserted into the inserting hole 106 from an opening of the inserting hole 6 at the lower end 102. It is required that the side surface of the lower magnetic core 4 facing away from the upper magnetic core 3 should not go beyond the welding surface 102 in order to avoid affecting the welding effect. In order to prevent the side surface of the lower magnetic core 4 facing away from the upper magnetic core 3 from going beyond the welding surface, it is possible in design to form a height difference between the welding surface 120 and the bottom surface 102*a* enough to receive the lower magnetic core 4, or to arrange a lower through groove 102*b* in the bottom surface 102*a* which is used to receive the lower magnetic core 4. In this case, in order to insert the central column 40 into the inserting hole 106, it is necessary for the inserting hole 106 to extend to the lower through groove 102*b*. At the same time, in order to prevent the lower magnetic core 4 from interfering with the auxiliary winding parts 12, the auxiliary winding parts 12 extend in directions perpendicular to the extension direction of the lower through groove 102*b*, and namely the auxiliary winding parts 12 are arranged at sides of the lower through groove 102*b*.

Figure 7:
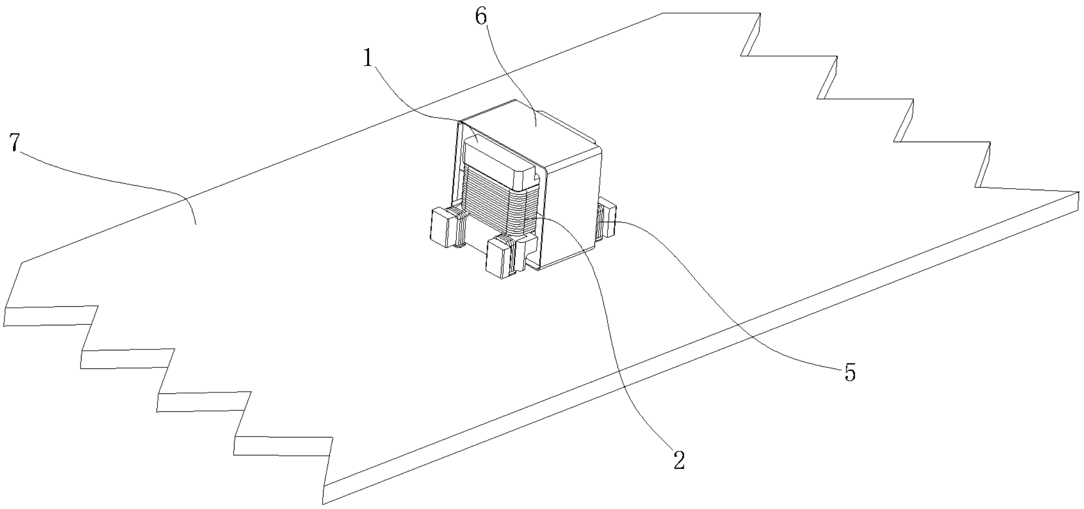
FIG. 7 is a schematic view of a welding structure of the inductance device of the present application and a PCB.

When the inductance device is assembled onto the PCB 7, a portion of the enamel of the auxiliary coils 5 covering the welding surfaces 120 is melt by high temperature to expose internal metal wires. Under high temperature the metal wires will melt and flow onto a bonding pad on the PCB 7, and after cooling and solidifying, the welding operation of the auxiliary coils 5 and the bonding pad can be finished (see FIG. 7). Because it is unnecessary to reserve the region in the bonding pad for the pins to pass through, the boding pad has an area reduced greatly and even can completely be hidden under the inductance device, thus greatly saving the area of the PCB 7.

To improve the stability of assembly, it is possible that the auxiliary winding parts 12 extend at two sides of the lower end 102 symmetric to the inserting hole 106 and the auxiliary coils 5 are wound around auxiliary winding parts 12 at each side, so that the inductance device can have a welded connection with the PCB at its two sides by the auxiliary coils 5 during the welding operation, and the high stability is obtained. The number of the auxiliary winding parts 12 and the auxiliary coils 5 can be adjusted according to the required structural strength and the need for electrical connection. Usually, the number of the auxiliary winding parts 12 is in a range from two to five, and it is preferred to use the technical solution with four auxiliary winding parts, and any two of the four auxiliary winding parts are symmetrical to each other.

Figure 8:
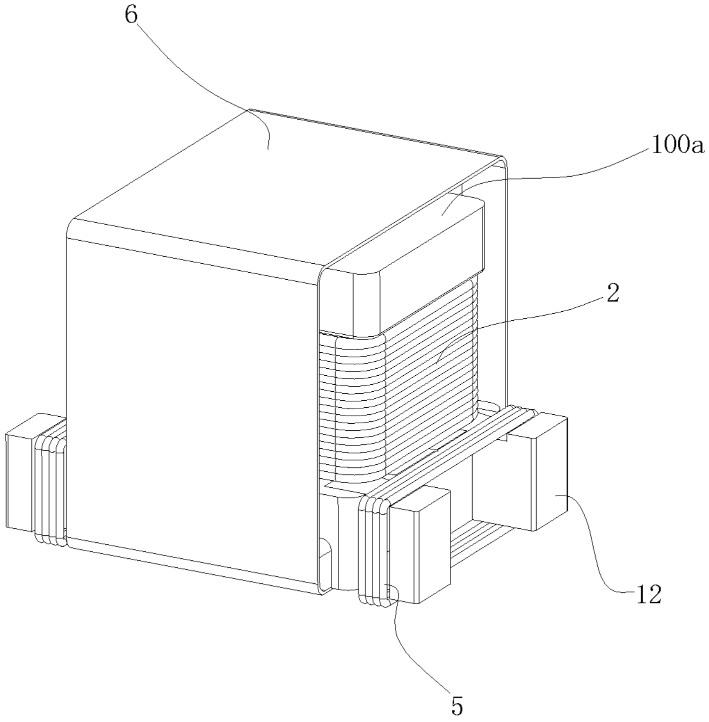
FIG. 8 is a schematic perspective view of an inductance device of the present application with the same auxiliary coil simultaneously wound around a plurality of auxiliary winding parts.

In the embodiment, usually each auxiliary coil 5 is separately wound around one auxiliary winding part 12, and however one auxiliary coil 5 being simultaneously wound around a plurality of the auxiliary winding parts 12 at the same side of the lower end 102 is not excluded in the embodiment. For example, in the technical solution shown in FIG. 8, the two auxiliary winding parts 12 at the same side can be used as two supporting points around which the enameled wire is wound to form an elongated auxiliary coil 5. This kind of auxiliary coil 5 and the PCB have a larger welding area, and the better structural stability and electrical stability are obtained. Of course, when winding, in addition to the two auxiliary winding parts 12 as the supporting points, other auxiliary winding parts 15 can be included in the middle of the auxiliary coil 5 to support the middle part, and therefore the same auxiliary coil 5 can be simultaneously wound around two or more auxiliary winding parts 12.

Figure 9:
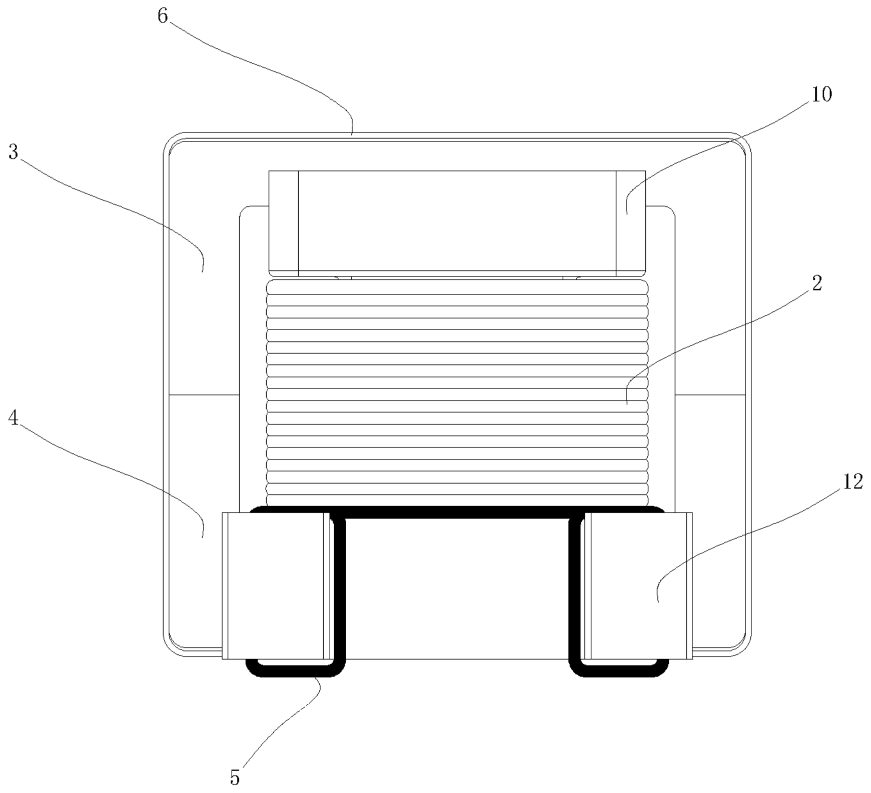
FIG. 9 is a schematic view of the inductance device of the present application which is provided with auxiliary coils wound in one winding way.
Figure 10:
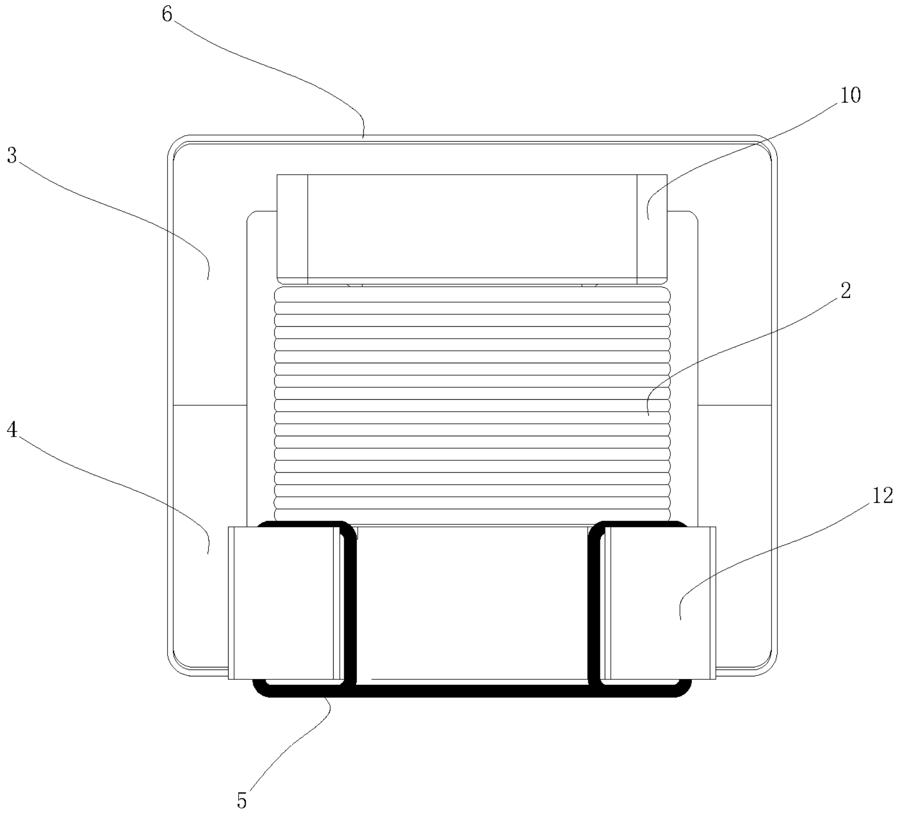
FIG. 10 is a schematic view of the inductance device of the present application which is provided with auxiliary coils wound in a second winding way.
Figure 11:
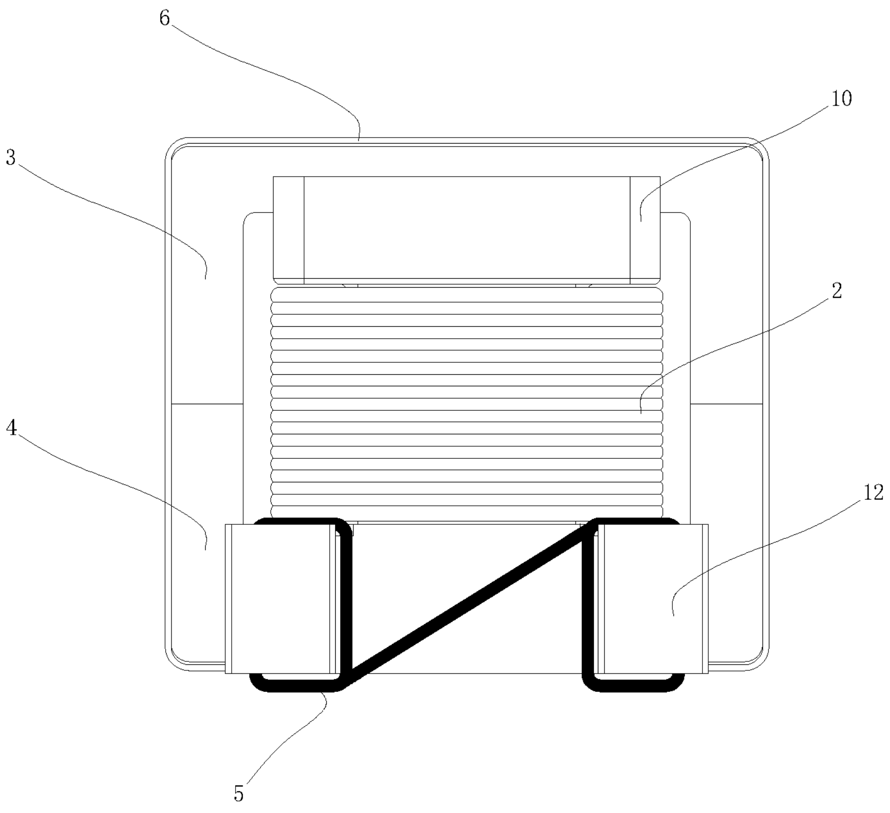
FIG. 11 is a schematic view of the inductance device of the present application which is provided with auxiliary coils wound in a third winding way.
Figure 12:
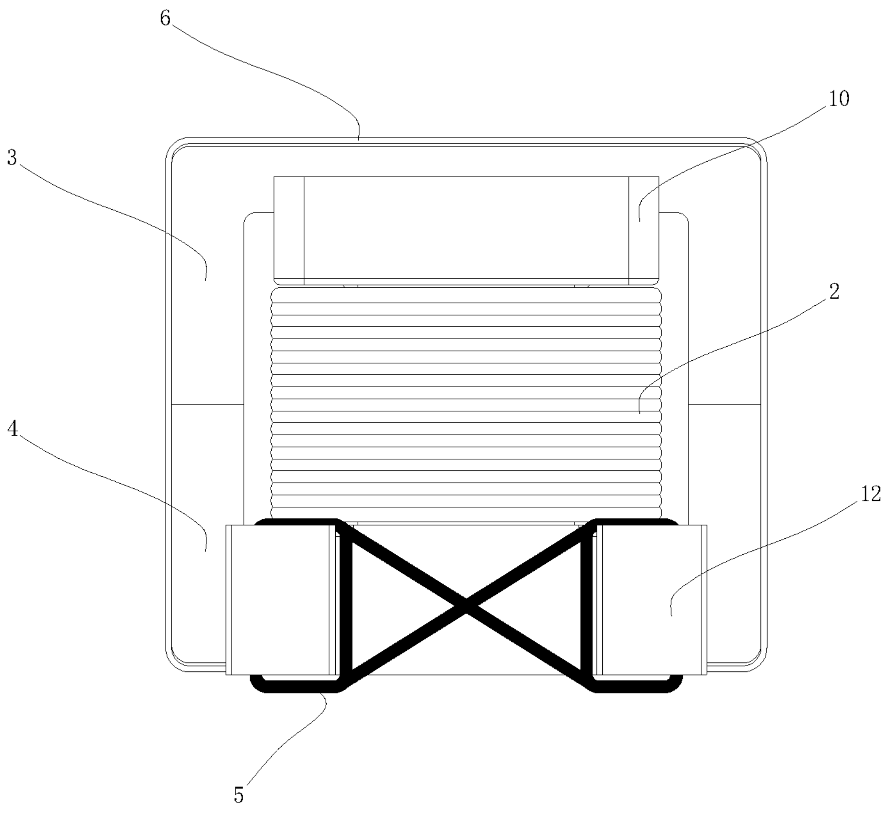
FIG. 12 is a schematic view of the inductance device of the present application which is provided with auxiliary coils wound in a fourth winding way.
Figure 13:
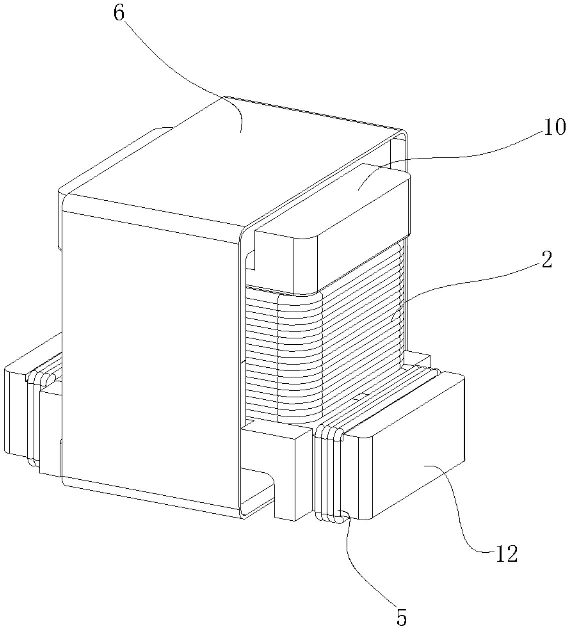
FIG. 13 is a schematic perspective view of an inductance device of the present application which is provided with elongated auxiliary winding parts.

In addition, as shown in FIG. 9, the enameled wire can be led from a surface 123 of one auxiliary winding part 12 to a surface 123 of the other auxiliary winding part 123. As shown in FIG. 10, the enameled wire can be led from a welding surface 120 of one auxiliary winding part 12 to a welding surface 120 of the other auxiliary winding part 12. As shown in FIG. 11, the enameled wire can also be led from a surface 123 of one auxiliary winding part 12 to a surface 123 of the other auxiliary winding part 12. Also, as shown in FIG. 12, the enameled wire can also be led from a welding surface 120 of one auxiliary winding part 12 to a welding surface 120 of the other auxiliary winding part 12, thus forming a slash or crossing structure. In addition to the structures described above, as shown in FIG. 13, in some embodiments, it is also possible that the enameled wire is wound around the auxiliary winding part 5 which is lengthened to form an elongated auxiliary coil 5.

Figure 2:
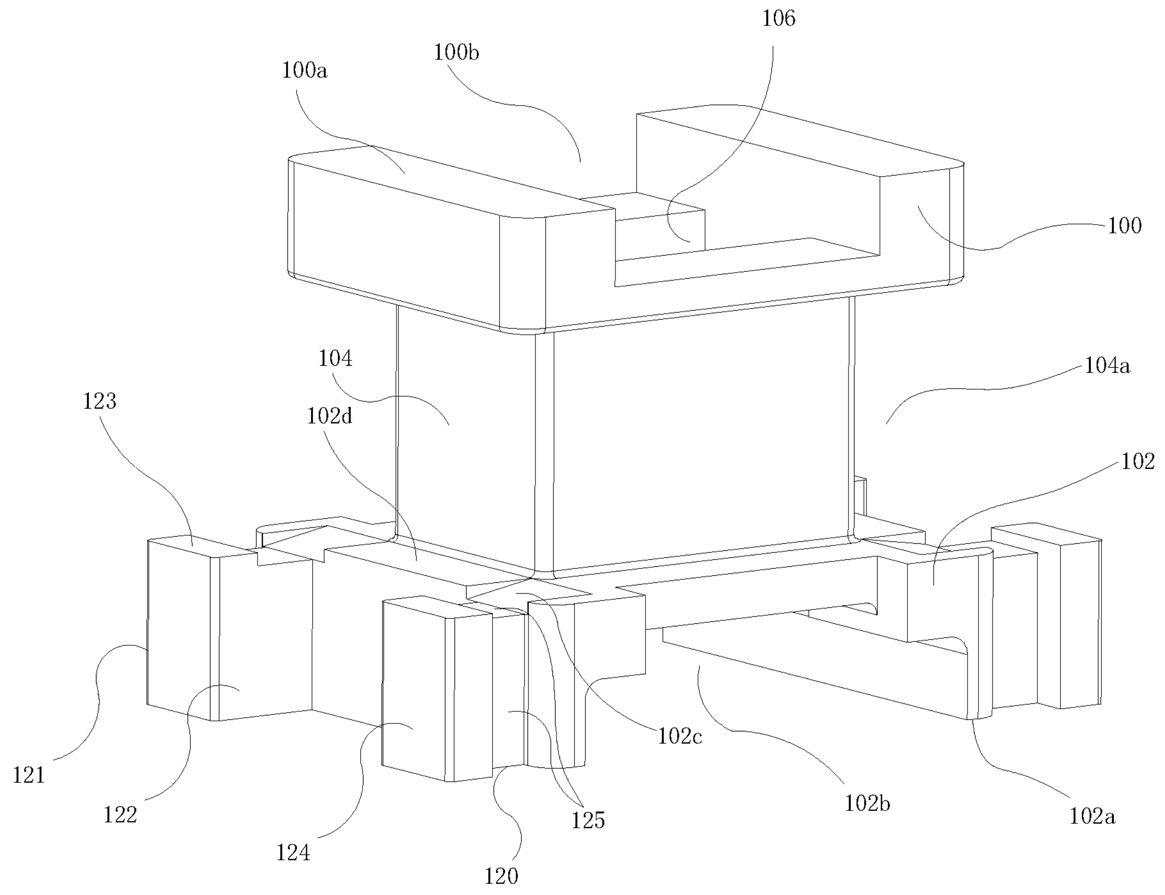
FIG. 2 is a perspective view of an inductor framework of the present application.
Figure 3:
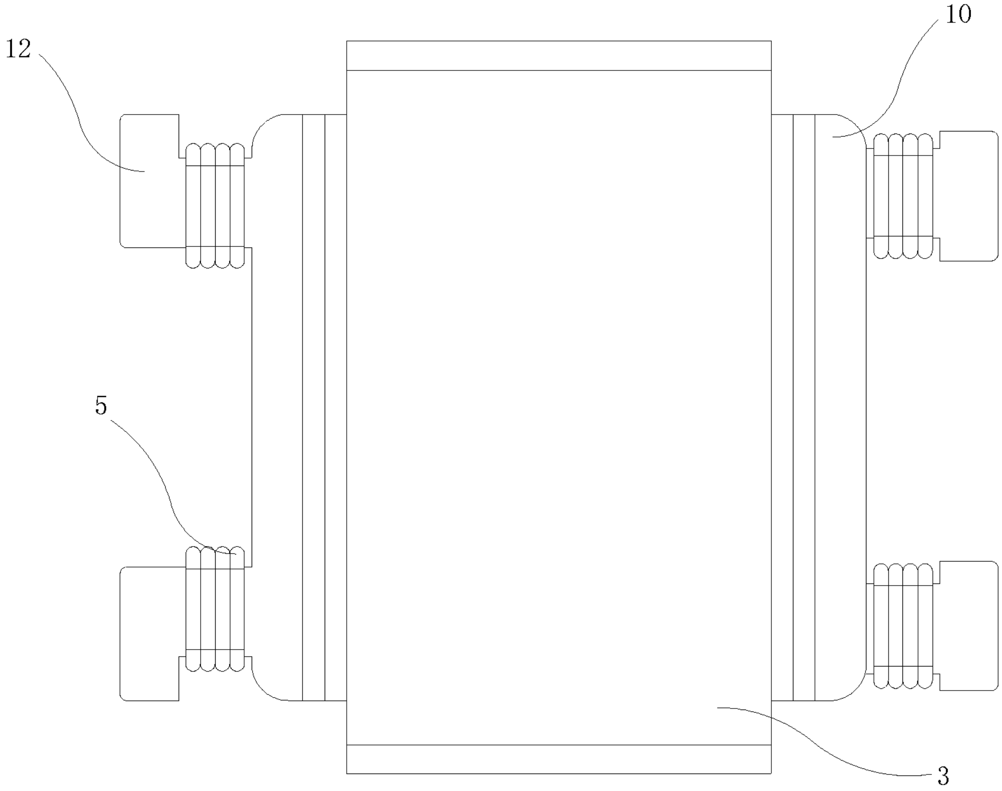
FIGS. 3-6 are schematic top views of several kinds of inductance devices of the present application which are provided respectively with different number of auxiliary winding parts.
Figure 4:
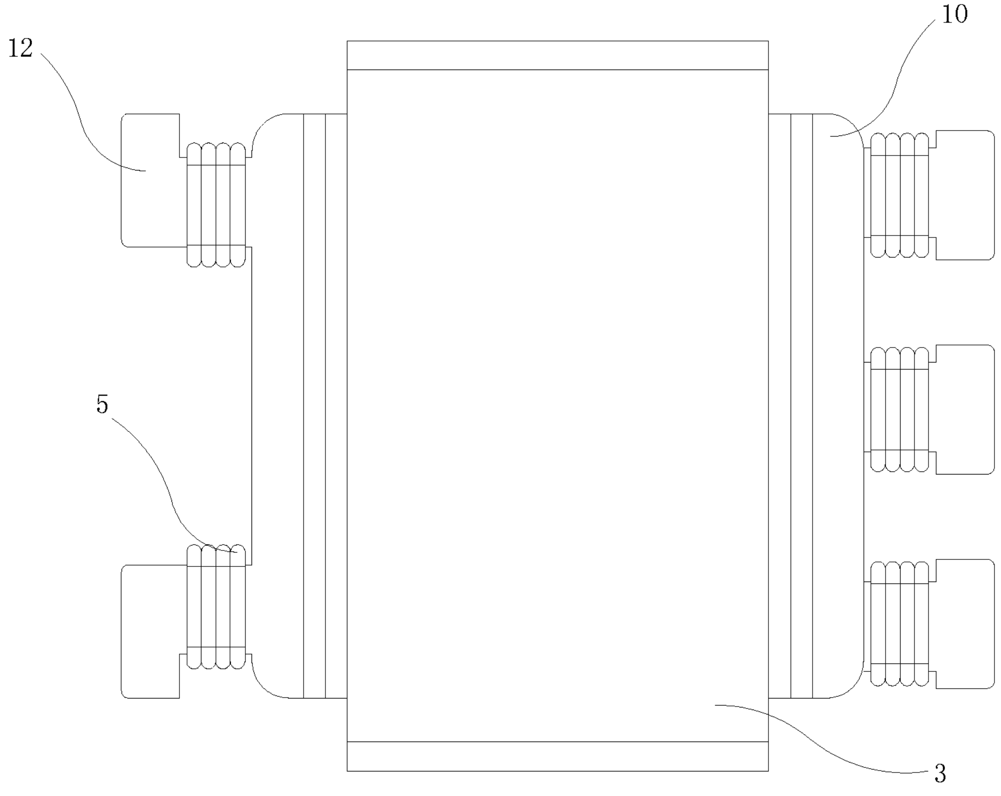
Figure 5:
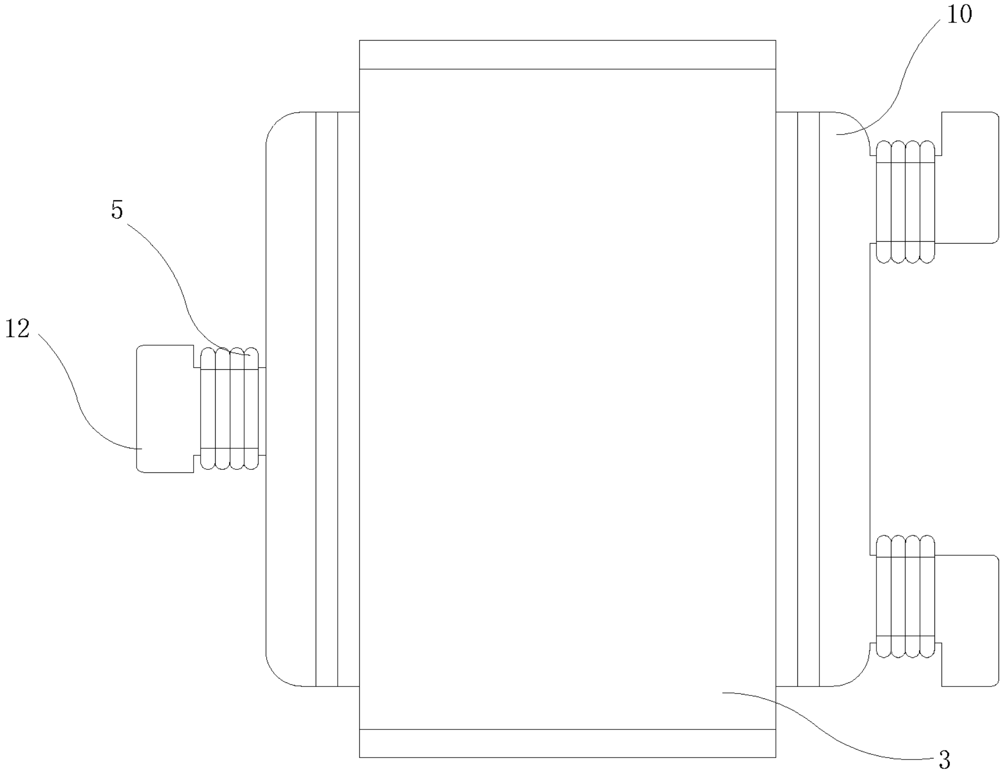
Figure 6:
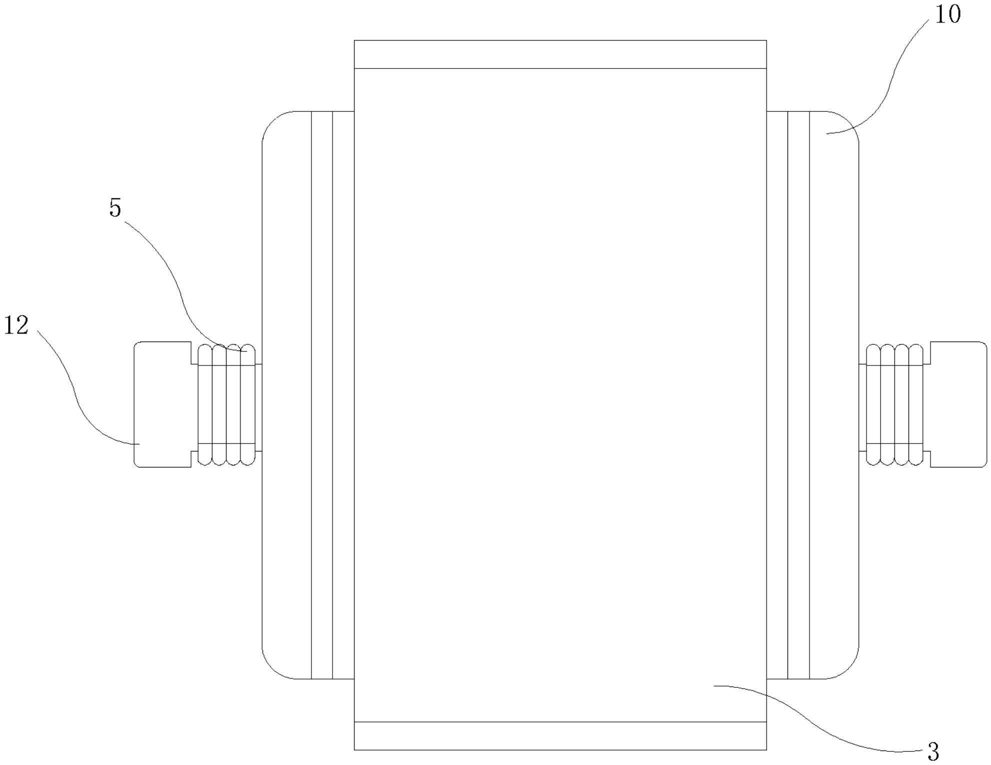

When the enameled wire is required to extend to the auxiliary winding part 12 after being wound to form the main coil 2, or when the enameled wire is required to extend to the main winding groove 104*a* after being wound to form the auxiliary coil 5, it is necessary for the enameled wire to extend for a distance to arrive at the auxiliary winding parts 12 or the main winding groove 104*a*. For the regularization of the enameled wire within the distance to make the whole of coils tidier, as shown in FIG. 2, in the embodiment, the lower end 102 are also provided with wire routing grooves 102*c* which are located at one side of the lower end 102 facing the upper end 100 and extend from the main winding groove 104_a_ to sides of the auxiliary winding parts facing the upper end 100, namely the sides where the surfaces 123 are located, so that the enameled wire can transfer between the main winding groove 104_a_ and the auxiliary winding parts 12 through the wire routing grooves 102_c_. The portion of the enameled wire between the main coil 2 and the auxiliary coils 5 will be restricted by the wire routing grooves 102_c_, thus forming a tidy appearance.

In order to prevent the wire routing grooves 102_c_ from affecting the winding of the main coil 2, the wire routing grooves 102_c_ cannot protrude from the surface 102_d_ of the lower end 102 facing the upper end 100. Therefore, in the present embodiment, the side of the auxiliary winding parts 12 facing the upper end 100 are at a distance from the upper end 100 in the extension direction of the inserting hole 106 greater than the distance between the surface 102_d_ of the lower end 102 facing the upper end 100 and the upper end 100 in the extension direction of the inserting hole 106, and namely the sides of the auxiliary winding parts 12 facing the upper end 100 are at a farther distance from the upper end 100. In this way, the wire routing grooves 102_c_ can form inclined grooves to gradually move away from the upper end 100 in an oblique way from the surface 102_d_ and finally extend to the auxiliary winding parts 12, thus avoiding the wire routing grooves 102_c_ from protruding from the surface 102_d_.

The sides of the auxiliary winding parts 12 facing the upper end 100 can be the surfaces 123, and can be the bottoms of the position limiting grooves 125 in the case where position limiting grooves 125 are provided at the surfaces 123.

For mechanized production, an attaching mechanism is usually used when transferring the inductance device, and for the convenience of attaching, it is necessary to arrange an attaching surface easy to be attached in the inductance device. With respect to the inductance device, the surface 32 of the upper magnetic core 3 facing away from the lower magnetic core 4 is an integral surface of a large area, and therefore is usually used as an attaching surface. With miniaturization of the inductance device, the surface 32 has a decreased area to make it more difficult to meet attaching requirements.

For the improvement of the attaching effect of the miniaturized inductance device, as shown in FIG. 2, in the present embodiment, the top surface 100_a_ is also provided with an upper through groove 100_b_ to which the inserting hole 106 extends. It should be noted that the upper through groove 100_b_ extends in a direction perpendicular to the extension directions of the auxiliary winding parts 12, because it is necessary for the lower magnetic core 4 to avoid the auxiliary winding parts 12 and to be arranged oppositely to the upper magnetic core 3. Meanwhile, it is also necessary for an attaching structure 6 to be arranged in the inductance device. When assembling the upper magnetic core 3 with the inductor framework 1, the upper magnetic core 3 is capped into the upper through groove 100_b_, so that the surface 32 is flush with the top surface 100_a_, and the attaching structure 6 simultaneously covers the surface 32 and at least a portion of the top surface 100_a_ (see FIG. 8). In this case, the attaching area includes a portion of the top surface 100_a_ in addition to the surface 32, thereby increasing the attaching area and improving the attaching effect.

In the embodiment, the attaching structure 6 can be a baffle plate which is attached onto the surface 32 and at least a portion of the top surface 100_a_. Because the inductance device generates lots of heat in working condition, it is possible to use the baffle plate made from a high temperature resistant insulation material to avoid the damage of the baffle plate.

In addition, a high temperature resistant adhesive tape is also used for the attaching structure 6. The adhesive tape is wound in the extension direction of the upper through groove 100_b_ to cover outer circumferences of the upper magnetic core 3 and the lower magnetic core 4 and at least a portion of the top surface 100_a_. The upper through groove 100_b_ and the lower through groove 102_b_ in the embodiment can be arranged simultaneously, or one of them can be arranged separately. If there are both the upper through groove 100_b_ and the lower through groove 102_b_, the upper through groove 100_b_ has the same extension direction as the lower through groove 102_b_. In this case, it is necessary for the adhesive tape to cover a portion of the top surface 100_a_, the adhesive tape has a width larger than that of the upper magnetic core 3 and larger than that of the lower magnetic core 4. If the lower through groove 102_b_ has the same notch size as the upper through groove 100_b_, the adhesive tape not only goes beyond the upper through groove 100_b_ to cover the top surface 100_a_ during winding, but also goes beyond the lower through groove 102_b_. However, the adhesive tape going beyond the lower through groove 102_b_ can affect adversely the welding process, so it is recommended in the embodiment that the lower through groove 102_b_ of the inductor framework 1 is designed to have a notch size larger than that of the upper through groove 102_a_, so as to receive the adhesive tape.

Preferably, in the above mentioned inductor framework, the position limiting structure is a position limiting groove configured to receive a portion of the auxiliary coil.

Preferably, in the above mentioned inductor framework, the position limiting groove extends in a direction identical and/or perpendicular to the extension direction of the inserting hole.

Preferably, in the above mentioned inductor framework, the auxiliary winding part extends at two sides of the lower end symmetrical to the inserting hole.

Preferably, in the above mentioned inductor framework, the number of the auxiliary parts is in a range from two to five.

Preferably, in the above mentioned inductor framework, four auxiliary winding parts are provided, and any two of the four auxiliary winding parts are symmetrical to each other.

Preferably, in the above mentioned inductor framework, the top surface is provided with an upper through groove to which the inserting hole extends, and the auxiliary winding part extends in a direction perpendicular to an extension direction of the upper through groove.

Preferably, in the above mentioned inductor framework, the bottom surface is provided with a lower through groove to which the inserting hole extends, and the auxiliary winding part extends in a direction perpendicular to an extension direction of the lower through groove.

Preferably, in the above mentioned inductor framework, the top surface is provided with an upper through groove to which the inserting hole extends, an extension direction of the upper through groove is the same as that of the lower through groove, and a notch size of the lower through groove is a larger than that of the upper through groove.

Preferably, in the above mentioned inductor framework, the lower end is further provided with a wire routing groove, and the wire routing groove is located at a side of the lower end facing the upper end and extends to a side of the auxiliary winding part facing the upper end from the main winding groove.

Preferably, in the above mentioned inductor framework, a distance between the side of the auxiliary winding part facing the upper end and the upper end in the extension direction of the inserting hole is greater than a distance between the side of the lower end facing the upper end and the upper end in the extension direction of the inserting hole, and the wire routing groove is an inclined groove.

Preferably, in the above mentioned inductor framework, the inductor framework is an inductor framework of phenolic plastic.

Preferably, in the above mentioned inductance device, the main coil and the auxiliary coil are formed by winding with the same enameled wire or different enameled wires.

Preferably, in the above mentioned inductance device, the auxiliary coil includes at least two auxiliary coils, and the main coil and at least two of the auxiliary coils are formed by winding with the same enameled wire.

Preferably, in the above mentioned inductance device, the auxiliary coil includes at least one auxiliary coil which is wound separately around one of the auxiliary winding part.

Preferably, in the above mentioned inductance device, the auxiliary coil includes at least one auxiliary coil, at least one auxiliary coil is wound simultaneously around a plurality of auxiliary winding parts at the same side of the lower end.

Preferably, in the above mentioned inductance device, the top surface is provided with an upper through groove to which the inserting hole extends, and the auxiliary winding part extends in a direction perpendicular to an extension direction of the upper through groove, the inductance device further includes an attaching structure; the upper magnetic core is capped onto the upper through groove, a surface of the upper magnetic core facing away from the lower magnetic core is flush with the top surface, and the attaching structure covers both the surface of the upper magnetic core facing away from the lower magnetic core and at least a portion of the top surface.

Preferably, in the above mentioned inductance device, the bottom surface is provided with a lower through groove which extends in the same direction as the upper through groove, the inserting hole extends to the lower through groove, and a notch size of the lower through groove is larger than that of the upper through groove; and the attaching structure is an adhesive tape which is wound in the extension direction of the lower through groove to cover an outer circumference of both the upper magnetic core and the lower magnetic core and to cover at least a portion of the top surface.

Preferably, in the above mentioned inductance device, the attaching structure is a baffle plate which is attached onto both a surface of the upper magnetic core facing away from the lower magnetic core and at least a portion of the top surface.

At least one technical solution adopted by the embodiment of the present application can achieve the following beneficial effects: the inductor framework and the inductance device provided by the embodiment of the present application can weld a portion of the auxiliary coil covering the welding surface with a pad on a PCB during assembling. Because it is unnecessary to reserve a region in the pad for pins to pass through, so the area can be greatly reduced or even completely hidden under the inductor device, thus greatly saving the area of the PCB.

The inductance device includes a main coil, an auxiliary coil, an upper magnetic core, a lower magnetic core, and an inductor framework, the main coil is wound in the main winding groove, the auxiliary coil is wound around the auxiliary winding part and covers a portion of the welding surface; the upper magnetic core is capped onto the top surface, the lower magnetic core is capped onto the bottom surface, a side surface of the lower magnetic core facing away from the upper magnetic core does not go beyond the welding surface. The inductor framework and the inductance device provided by the embodiments of the present application can greatly save the area of the PCB.

AA The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above embodiments of this application focus on the differences between the various embodiments. As long as the different optimization features between the various embodiments are not contradictory, they can be combined to form a better embodiment, without repeated here considering the conciseness of the text.

The above descriptions are only embodiments of this application and are not used to be construed as any limitation to the present application. For those skilled in the art, the present application can have various modifications and changes. Any modification, equivalent replacement, improvement, etc. made within the spirit and principle of the present application shall be included in the scope of the claims of the present application.

What is claimed is:

1. An inductor framework, comprising:

a main winding part and an auxiliary winding part that are integrally arranged;

wherein the main winding part comprises an upper end, a lower end, a main body, and an inserting hole; the main body is located between the upper end and the lower end, edges of both the upper end and the lower end go beyond the main body and cooperate with the main body to form a main winding groove; the upper end has a top surface facing away from the lower end, and the lower end has a bottom surface facing away from the upper end; the inserting hole successively passes through the upper end, the main body, and the lower end in a direction from the top surface to the bottom surface; and wherein the auxiliary winding part extends towards a direction away from the inserting hole from the lower end, and the auxiliary winding part has an extension direction perpendicular to that of the inserting hole; a side surface of the auxiliary winding part facing away from the upper end is a welding surface that is at a distance from the top surface in the extension direction of the inserting hole no less than a distance between the bottom surface and the top surface in the extension direction of the inserting hole; the auxiliary winding part is configured to be wound thereon an auxiliary coil that covers at least a portion of the welding surface, the auxiliary winding part is provided with a position limiting structure configured to prevent the auxiliary coil that is wound around the auxiliary winding part from separating from the auxiliary winding part.

2. The inductor framework according to claim 1, wherein the position limiting structure is a position limiting groove configured to receive a portion of the auxiliary coil.

3. The inductor framework according to claim 2, wherein the position limiting groove extends in a direction identical and/or perpendicular to the extension direction of the inserting hole.

4. The inductor framework according to claim 1, wherein the auxiliary winding part extends at two sides of the lower end symmetrical to the inserting hole.

5. The inductor framework according to claim 4, wherein the number of the auxiliary parts is in a range from two to five.

6. The inductor framework according to claim 5, wherein four auxiliary winding parts are provided, and any two of the four auxiliary winding parts are symmetrical to each other.

7. The inductor framework according to claim 1, wherein the top surface is provided with an upper through groove to which the inserting hole extends, and the auxiliary winding part extends in a direction perpendicular to an extension direction of the upper through groove.

8. The inductor framework according to claim 1, wherein the bottom surface is provided with a lower through groove to which the inserting hole extends, and the auxiliary winding part extends in a direction perpendicular to an extension direction of the lower through groove.

9. The inductor framework according to claim 8, wherein the top surface is provided with an upper through groove to which the inserting hole extends, an extension direction of the upper through groove is the same as that of the lower through groove, and a notch size of the lower through groove is a larger than that of the upper through groove.

10. The inductor framework according to claim 1, wherein the lower end is further provided with a wire routing groove, and the wire routing groove is located at a side of the lower end facing the upper end and extends to a side of the auxiliary winding part facing the upper end from the main winding groove.

11. The inductor framework according to claim 10, wherein a distance between the side of the auxiliary winding part facing the upper end and the upper end in the extension direction of the inserting hole is greater than a distance between the side of the lower end facing the upper end and the upper end in the extension direction of the inserting hole, and the wire routing groove is an inclined groove.

12. The inductor framework according to claim 1, wherein the inductor framework is an inductor framework of phenolic plastic.

13. An inductance device, wherein the inductance device comprises a main coil, an auxiliary coil, an upper magnetic core, a lower magnetic core, and the inductor framework; and wherein the inductor framework comprises: a main winding part and an auxiliary winding part that are integrally arranged;

wherein the main winding part comprises an upper end, a lower end, a main body, and an inserting hole; the main body is located between the upper end and the lower end, edges of both the upper end and the lower end go beyond the main body and cooperate with the main body to form a main winding groove; the upper end has a top surface facing away from the lower end, and the lower end has a bottom surface facing away from the upper end; the inserting hole successively passes through the upper end, the main body, and the lower end in a direction from the top surface to the bottom surface;

wherein the auxiliary winding part extends towards a direction away from the inserting hole from the lower end, and the auxiliary winding part has an extension direction perpendicular to that of the inserting hole; a side surface of the auxiliary winding part facing away from the upper end is a welding surface that is at a distance from the top surface in the extension direction of the inserting hole no less than a distance between the bottom surface and the top surface in the extension direction of the inserting hole; the auxiliary winding part is configured to be wound thereon an auxiliary coil that covers at least a portion of the welding surface, the auxiliary winding part is provided with a position limiting structure configured to prevent the auxiliary coil that is wound around the auxiliary winding part from separating from the auxiliary winding part; and wherein the main coil is wound in the main winding groove, the auxiliary coil is wound around the auxiliary winding part and covers a portion of the welding surface; both the upper magnetic core and the lower magnetic core are E-shaped structures, a middle extension portion of each of the E-shaped structures is a central column; the upper magnetic core is capped onto the top surface, the central column of the upper magnetic core is inserted into the inserting hole, the lower magnetic core is capped onto the bottom surface, the central column of the lower magnetic core is also inserted into the inserting hole, and a side surface of the lower magnetic core facing away from the upper magnetic core does not go beyond the welding surface.

14. The inductance device according to claim 13, wherein the main coil and the auxiliary coil are formed by winding with the same enameled wire or different enameled wires.

15. The inductance device according to claim 14, wherein the auxiliary coil comprises at least two auxiliary coils, and the main coil and at least two of the auxiliary coils are formed by winding with the same enameled wire.

16. The inductance device according to claim 13, wherein the auxiliary coil comprises at least one auxiliary coil which is wound separately around one of the auxiliary winding part.

17. The inductance device according to claim 13, wherein the auxiliary coil comprises at least one auxiliary coil, at least one auxiliary coil is wound simultaneously around a plurality of auxiliary winding parts at the same side of the lower end.

18. The inductance device according to claim 13, wherein the top surface is provided with an upper through groove to which the inserting hole extends, and the auxiliary winding part extends in a direction perpendicular to an extension direction of the upper through groove; and wherein the inductance device further comprises an attaching structure; the upper magnetic core is capped onto the upper through groove, a surface of the upper magnetic core facing away from the lower magnetic core is flush with the top surface, and the attaching structure covers both the surface of the upper magnetic core facing away from the lower magnetic core and at least a portion of the top surface.

19. The inductance device according to claim 18, wherein the bottom surface is provided with a lower through groove which extends in the same direction as the upper through groove, the inserting hole extends to the lower through groove, and a notch size of the lower through groove is larger than that of the upper through groove; and wherein the attaching structure is an adhesive tape which is wound in the extension direction of the lower through groove to cover an outer circumference of both the upper magnetic core and the lower magnetic core and to cover at least a portion of the top surface.

20. The inductance device according to claim 18, wherein the attaching structure is a baffle plate which is attached onto both a surface of the upper magnetic core facing away from the lower magnetic core and at least a portion of the top surface.

* * * * *